United States Patent [19]

Ohara

[11] Patent Number: 5,107,770
[45] Date of Patent: Apr. 28, 1992

[54] CONVEYOR DRIVE SYSTEM
[75] Inventor: Osamu Ohara, Iwata, Japan
[73] Assignee: Yamaha Hatsudoki Kabushiki Kaisha, Japan
[21] Appl. No.: 695,086
[22] Filed: May 3, 1991
[30] Foreign Application Priority Data
  May 11, 1990 [JP] Japan .................. 2-119746
[51] Int. Cl.⁵ .............................. B60L 5/08
[52] U.S. Cl. ..................... 104/300; 246/187 R; 246/182 C; 104/295
[58] Field of Search ............ 104/295, 300, 287, 288, 104/89, 296; 246/182 R, 182 C, 186, 187 R; 105/49, 61, 148

[56] References Cited
U.S. PATENT DOCUMENTS

| | | | |
|---|---|---|---|
| 3,153,391 | 10/1964 | Forestall | 104/300 |
| 3,355,643 | 11/1967 | Benson | 104/295 |
| 3,800,707 | 4/1974 | Hermann | 104/300 |
| 3,870,939 | 3/1975 | Robert | 104/300 |
| 3,941,202 | 3/1976 | Sorkin | 104/300 |
| 4,248,156 | 2/1981 | Takeuchi et al. | 104/300 |
| 4,570,543 | 2/1986 | Ishikura et al. | 104/300 |
| 4,984,521 | 1/1991 | Riley | 104/295 |

FOREIGN PATENT DOCUMENTS

| | | | |
|---|---|---|---|
| 2544421 | 4/1977 | Fed. Rep. of Germany | 104/300 |
| 0236109 | 9/1989 | Japan | 104/300 |

Primary Examiner—Robert J. Oberleitner
Assistant Examiner—Mark T. Le
Attorney, Agent, or Firm—Bacon & Thomas

[57] ABSTRACT

A drive controller for a rail supported conveyor device made up of a plurality of wheel driven support carriages linked together includes a revolution sensor on one of the drive wheels of one of the support carriages, individual torque controllers on each of the carriages, and a device for providing a common torque signal to the various torque controllers based on the difference between the measured speed of the one speed sensor and the desired speed of the carriages.

5 Claims, 3 Drawing Sheets

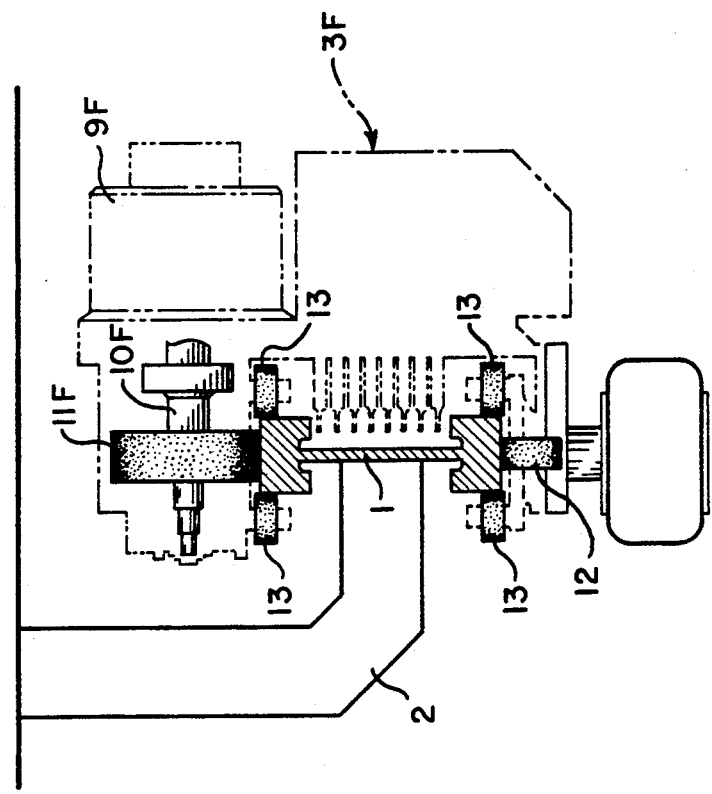
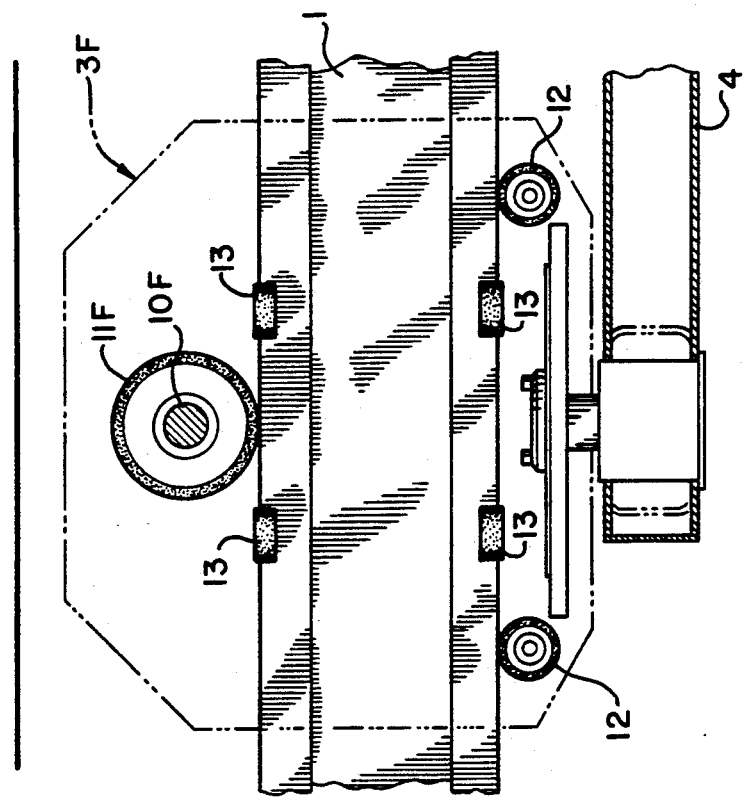
Fig. 4
Fig. 3

CONVEYOR DRIVE SYSTEM

BACKGROUND OF THE INVENTION

1. Field of the Invention

This invention concerns a drive control device for a conveyor of the type having a plurality of linked support-carriages which run along a rail.

2. Description of Related Art

Conveyors of the type utilizing a plurality of support-carriages running along an overhead rail are employed in assembly line operations, for example, to transport parts automatically to locations where they are needed. In such a conveyor device, drive motors are used to drive wheels on the support carriages which cause them to move along the top of the rail. Some conveyors of this type have the various support carriages linked together. When all of the drive wheels on the support-carriages have the same diameter, the overall speed of the linked support carriages can be controlled by keeping the number of revolutions per minute (rpms) of the drive wheels identical.

This type of speed control, however, is disadvantageous in that torque imbalances tend to arise among the various support-carriages resulting from difference in weights of the individual loads, and so forth, which affects the loads on the respective drive motors. Particularly in cases of very heavy loads, the drive motors are subject to overheating and breakdown.

SUMMARY OF THE INVENTION

It is an objective of the invention to make it possible to operate conveyor support carriages in a stable manner by evenly distributing the power supplied to the drive motors of the various carriages in a conveyor system of the type utilizing a plurality of linked together support carriages running along a common rail.

In order to achieve this objective, the invention provides a drive controller for a conveyor device in which at least one of the support carriages includes a detector for detecting the number of rotations of a drive wheel. Individual torque controllers on each of the support-carriage drive sources control the output torque in response to computation by a computer of the difference between a desired or "set" speed for the support carriages and their actual speed as determined by the wheel revolution detector. A speed controller gives a common torque command to the various individual torque controllers based upon the speed differential, and the individual torque controllers adjust the torque accordingly based on feedback from the drive sources.

In a preferred embodiment of the invention, one assumes that there is no slippage between the drive wheels of the various support-carriages and the rails, and that they all have the same diameter. The number of revolutions of all the drive wheels is then deemed to be identical as the support carriages move along the rails. Accordingly, by detecting the number of revolutions of any one of the drive wheels, the speed for the overall set of linked support-carriages is computed based on the speed of that drive wheel. This actual speed computation is fed back and compared to the desired speed setting, and the speed adjusted so that the differential between the set speed and the actual speed approaches zero. By issuing a common torque command based thereon to each torque control means, one obtains the result that not only do the linked support carriages run at the set speed, but the output torque on each support carriage's drive source can be adjusted to be identical. This evenly distributes the overall load on the linked conveyor support carriages, eliminating overheating of the drive motors and other problems so that the operation of the conveyor is normal and stable.

BRIEF DESCRIPTION OF THE DRAWINGS

FIG. 3 is a cross sectional side view of the support carriage shown in FIG. 1.

FIG. 4 is a front view of the support carriage shown in FIG. 3.

DETAILED DESCRIPTION OF THE PREFERRED EMBODIMENTS

Figure 1:
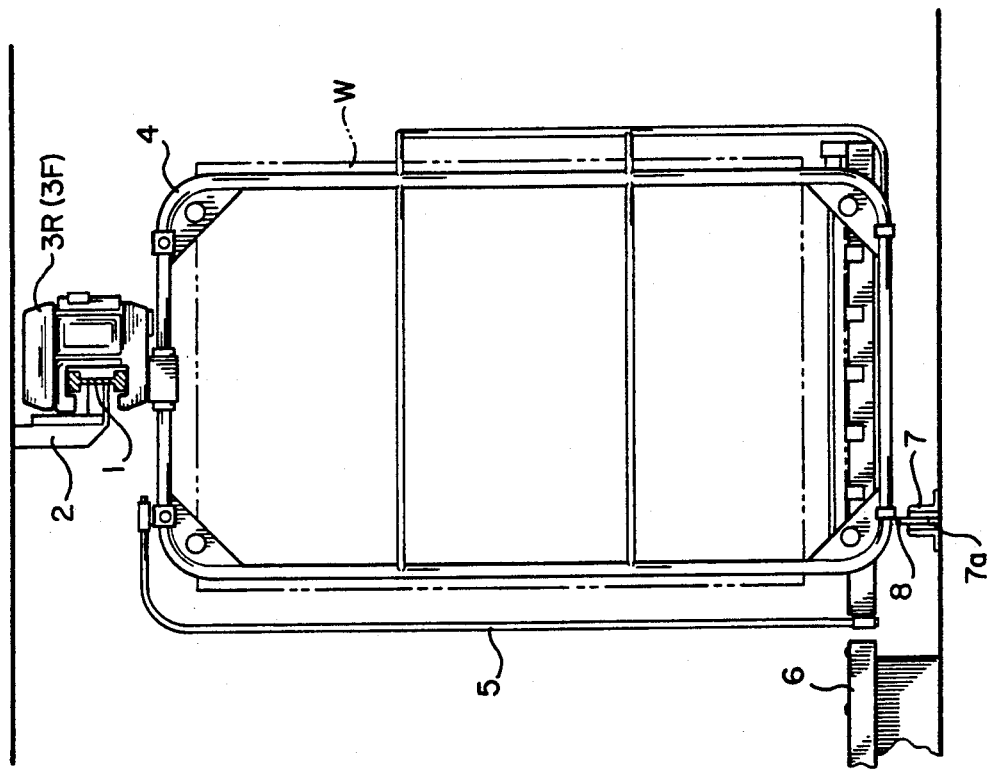
FIG. 1 is a side view of a conveyor device for use in connection with a preferred embodiment of the invention.
Figure 2:
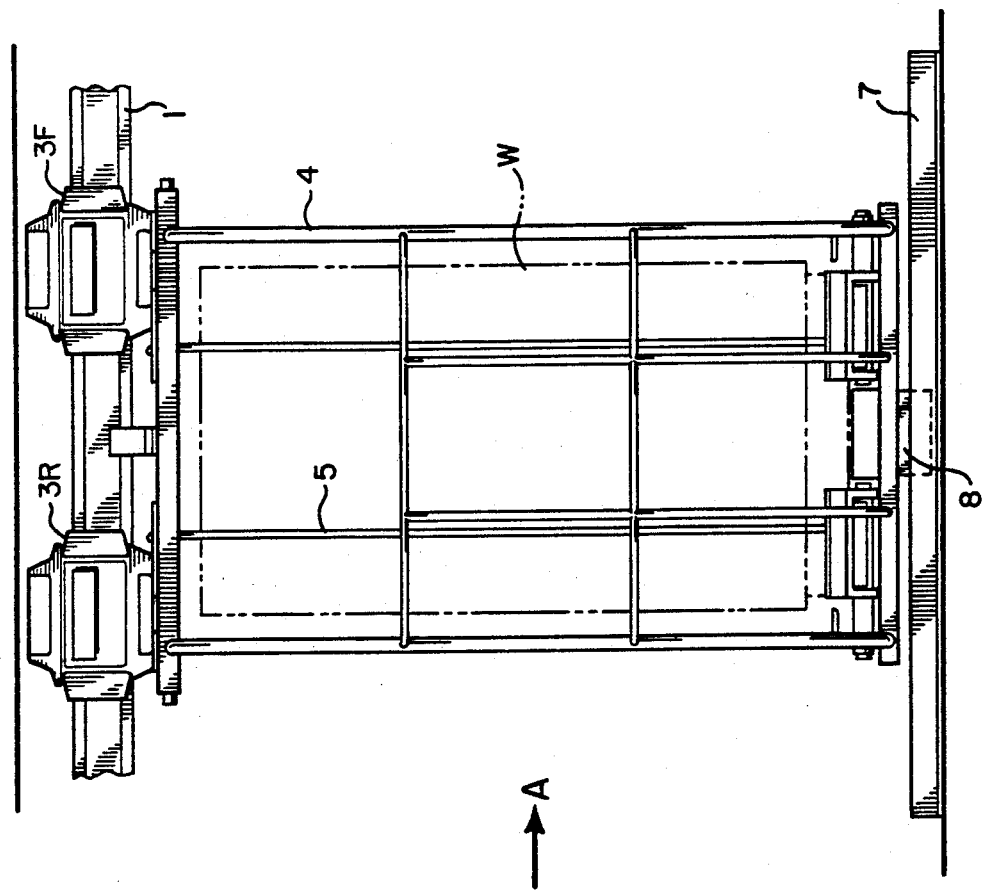
FIG. 2 is a view of the conveyor device of FIG. 1 taken in the direction of arrow A.

As shown in FIGS. 1 and 2, a monorail 1 is supported by a support arm 2 which is attached, for example, to the ceiling of a factory. Two support carriages 3F and 3R are linked together and supported so that they are free to travel along rail 1.

Support carriages 3F and 3R are of pipe frame construction. A frame structure loading device 4 is suspended beneath carriages 3F and 3R. Loading device 4 houses a workpiece W to be transported by the conveyor. An opening is provided on one side of the loading device 4 through which the workpiece W is loaded onto the conveyor and unloaded from the conveyor. The opening is shown as being on the left side in FIG. 2, and can be covered by a shutter 5 driven by a shutter motor (not shown). When the loading device stops in the positions indicated in FIGS. 1 and 2, shutter 5 opens and the workpiece W is moved in a transverse direction, to the left as shown in FIG. 2, to be loaded onto loading/unloading conveyor 6.

The loading position for workpiece W has, atop the floor, a positioning guide member 7 extending in the direction of progression of support carriages 3F and 3R. As shown in FIG. 2, positioning guide member 7 includes a groove 7A which is engaged by a planar engagement piece 8 projecting downward from loading device 7 to guide the support carriages 3F and 3R in the direction of travel. The action of engagement plate 8 and positioning guide member 7 prevents the loading device 4 from swinging.

Referring to FIGS. 3 and 4, a front motor 9F is provided on the top of support carriage 3F. Front motor 9F has an output shaft 10F which is positioned at a right angle in respect to monorail 1 so that drive wheel 11F attached to the output shaft makes contact with the rail. On the lower part of support carriage 3F are provided two lower rollers 12 which are free to rotate and which support the support carriage. Monorail 1 is sandwiched between drive wheel 11F and lower rollers 12.

At the top and bottom of the support carriages in respect to monorail 1, and to the left and right as shown in FIG. 4, are a total of eight side rollers 13 which come into contact with the sides of the monorail, and which are also free to rotate. Front motor 9F drives drive wheel 11F, causing support carriage 3F to move along monorail 1 while being guided by side rollers 13.

Figure 5:
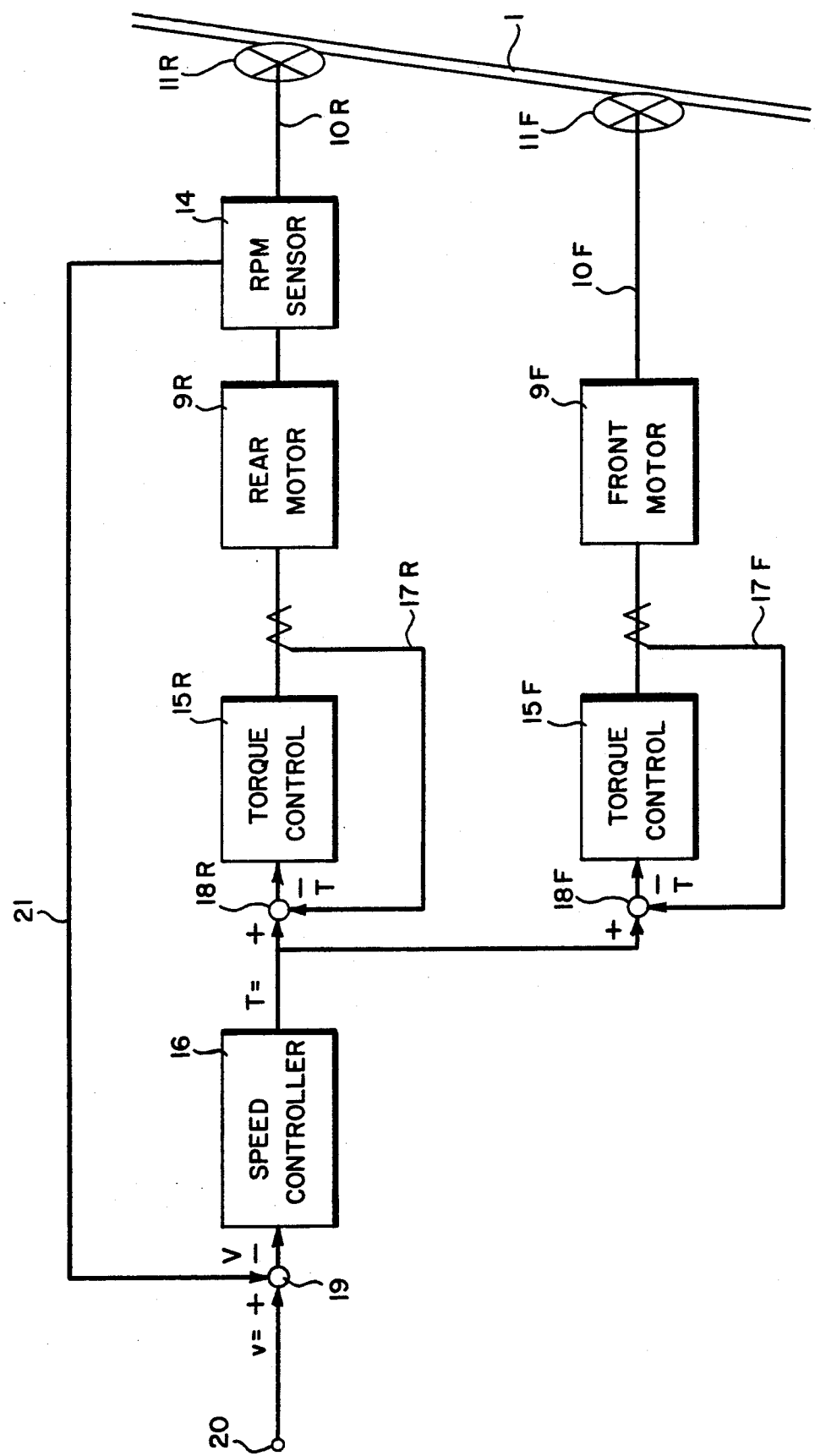
FIG. 5 is a block diagram of a drive control device according to the preferred embodiment of the invention.

The structure of support carriage 3R is the same as that of support carriage 3F, and thus support carriage 3R will not be separately described. However, support carriage 3R does have one difference in that it is driven by a rear drive wheel 11R, as shown in FIG. 5. The rear motor 9R drives the rear drive wheel 11R and causes support carriage 3R to run along monorail 1 together with front support carriage 3F.

Referring to FIG. 5, a rotation sensor or detector 14 is provided which detects the number of revolutions of the drive wheel 11R on output shaft 10R of rear motor 9R. Front and rear support carriages 3F and 3R are respectively equipped with front motor driver 15F and rear motor driver 15R which control the output torques on front motor 9F and rear motor 9R. Front motor torque controller 15F and rear motor torque controller 15R are electrically connected to speed controller 16. The drive control device of the invention thus includes revolution sensor 14, front motor driver/torque control 15F and rear motor driver/torque control 15R and speed controller 16. The torque controllers are of known type including feedback loops 17R and 17F which are connected to difference detectors 18R and 18F.

Drive wheels 11F and 11R of the support carriages 3F and 3R have the same diameter, and assuming that there is no slippage between these drive wheels and monorail 1, then in order for support carriages 3F and 3R to run linked together along monorail 1 at the same speed, the speed of rotation of both drive wheels must be identical. Therefore, a single rotation sensor 14 is provided to detect the number of revolutions of drive wheel 11R, thus providing the actual speed v of both support carriages 3F and 3R. This actual speed v is fed back to controller 16 via feedback loop 21, which makes a comparison between the actual speed v and a set speed $v^x$ as indicated by difference indicator 19. The set or desired speed $v^x$ may be set by a manual control or by an automatic control as desired, and an input via input 20.

The speed difference is computed according to the formula:

$$\Delta v = (v^x - v).$$

A common torque command $T^x$ is then issued by controller 16 to the front motor driver 15F and the rear motor driver 15R in order to adjust $\Delta v$ to zero.

Subsequently, front motor driver 15F and rear motor driver 15R respond to the torque command $T^x$ sent by controller 16, and issue torque signals T to the front motor 9F and rear motor 9R respectively. Torque signals T are fed back via feedback loops 17R and 17F to front motor driver 15R and rear motor driver 15F in order to minimize the differences between T and $T^x$. As a result, the output torque from front motor 9F and rear motor 9R is adjusted so that the overall load on the support carriages 3F and 3R is distributed evenly between the front motor 9F and the rear motor 9R. This prevents both the front and rear motors from becoming overloaded, and ensures that there is stable running of the support carriages at the speed for which they were set, $v^x$.

In the preferred embodiment described above, rotation sensor 14 is located at the output shaft 10R of the rear motor 9R, but it will of course be appreciated that rotation sensor 14 could also be located on the output shaft 10F of front motor 9F.

As is clear from the explanation provided above, this invention provides a drive control mechanism which includes a drive source, a revolution detection means which detects the number of revolutions of the drive wheel of at least one running support carriage on a conveyor device linking a number of support carriages. The invention also provides a plurality of torque control means for controlling the output torque of each of the running support carriage drive sources, means for computing the difference between the actual speed of the support carriages and the set speed, and a speed control means which issues a common torque command to the above-mentioned torque control means based upon the speed difference. Accordingly, the load is divided evenly among the drive sources for the various support carriages and stable running of the conveyor support carriages is obtained.

Because of the numerous variations of the preferred embodiment which will undoubtedly occur to those skilled in the art, it will be appreciated that the above description is to be taken solely by way of example, and that the invention is intended to be defined solely in accordance with the appended claims.

I claim:

1. A drive controller for a conveyor device of the type including a plurality of support carriages which have drive wheels powered into rotation by drive sources on respective support carriages, comprising:

detection means mounted on a drive wheel of at least one of said support carriages for counting the number of rotations of said drive wheel;

individual torque control means on each of said support carriage drive sources for individually controlling output torque thereof;

computing means for computing a difference between a set speed for the support carriages and their actual speed as determined by the wheel revolution detection means; and speed control means for supplying a common torque command to the torque control means based upon the speed differential, wherein said torque control means controls the torque of each of said drive sources according to said common torque command.

2. A drive controller as claimed in claim 1, wherein the support carriages are linked together and said detection means comprises a single detector on a single drive wheel of one said support carriages.

3. A drive controller as claimed in claim 2, wherein said individual torque control means comprise means for controlling the torque of a respective drive source according to the differential between said common torque command and a torque output.

4. A drive controller as claimed in claim 1, wherein said individual torque control means comprise means for adjusting the torque of a respective drive source according to the differential between said common torque command and a torque output.

5. A drive controller as claimed in claim 1, wherein said support carriages run along a single common rail.

* * * * *